United States Patent [19]

Bachmann

[11] Patent Number: 4,524,502

[45] Date of Patent: Jun. 25, 1985

[54] TONGS FOR INSERTING A CURTAIN-CARRYING SLIDING MEMBER INTO A PROFILED CURTAIN RAIL

[76] Inventor: Alfred Bachmann, 6, Sandackerweg, 3363 Oberoenz, Switzerland

[21] Appl. No.: 527,488

[22] Filed: Aug. 29, 1983

Related U.S. Application Data

[63] Continuation-in-part of Ser. No. 284,220, filed as PCT CH 80/00057 May 9, 1980, published as WO 81/01360, May 28, 1981, § 102(e) date Jul. 17, 1981, abandoned.

[30] Foreign Application Priority Data

Nov. 21, 1979 [CH] Switzerland ........................ 10368/79

[51] Int. Cl.³ ............................................ B23P 19/04

[52] U.S. Cl. ........................................ 29/268; 29/278; 81/418

[58] Field of Search ......................... 29/268, 270, 278; 81/418, 420, 421, 422, 423, 425 R, 425 A, 426, 5.1

[56] References Cited

U.S. PATENT DOCUMENTS

| | | | |
|---|---|---|---|
| 768,161 | 8/1904 | Thompson | 81/425 X |
| 1,085,461 | 1/1914 | Michaels | 81/5.1 R X |
| 2,471,372 | 5/1949 | Jankovich | 81/423 X |
| 3,401,444 | 9/1968 | Kovacs | 81/426 X |
| 4,198,738 | 4/1980 | Wallace | 29/268 |

*Primary Examiner*—Frederick R. Schmidt
*Assistant Examiner*—Steven P. Schad
*Attorney, Agent, or Firm*—Heinrich W. Herzfeld

[57] ABSTRACT

A tongs for inserting curtain carriers into a curtain rail comprises two arms having inward end faces turned toward one another. A cross bar of the curtain carrier rests upon rail shoulders to the left and right of a rail slot, and an upright bar of the carrier extends downwardly through the slot and bears a ring part therebelow. Each arm has a recess open at the top, and a bottom face extending transversely to, its inward face. The tong arms engage and hold fast in their recesses a curtain carrier from below. Each arm end comprises a centering plug protruding therefrom toward the opposite face so that, when the curtain carrier is seized between the arm ends of the closed tongs, the centering plugs penetrate with their free ends into the opening of the carrier ring part and hold the carrier fast on the bottom faces.

4 Claims, 5 Drawing Figures

TONGS FOR INSERTING A CURTAIN-CARRYING SLIDING MEMBER INTO A PROFILED CURTAIN RAIL

EARLIER APPLICATION

This application is a continuation-in-part of my pending patent application Ser. No. 06/284,220 filed as PCT CH 80/00057 May 9, 1980, published as WO 81/01360, May 28, 1981, § 102(e) date July 17, 1981 now abandoned.

BACKGROUND OF THE INVENTION

This invention relates to a tongs for inserting curtain-carrying sliding members one after the other into a curtain rail; such tongs being more particularly adapted for inserting a curtain-carrying sliding member comprising a track part having a T-shaped profile and consisting essentially of an upright bar portion, a cross bar portion to the center of the underside of which the upper end of the upright bar portion is attached, and a ring part having a ring opening and depending from the lower end of the upright bar portion, into a curtain rail having a longitudinal extending opening or slot in a bottom part thereof and shoulders of the rail bottom part to the right and to the left of the bottom opening, in such a manner that the cross bar portion of the glider member rests upon the shoulders of the rail bottom part, and the upright bar portion of the glider member track part extends downwardly through the rail bottom opening and protrudes with its lower end from the underside thereof, so that the ring part is located below the rail, and the curtain is attached at its upper rim to a plurality of such glider members.

These glider members and curtain rails have been known in commerce over a number of years.

The usual practice of hanging curtains using these curtain rails and glider members has been to sew a row of glider members, to the upper rim of the curtain, for instance spaced from 5 to 20 cm apart depending on the weight of the curtain and the number of folds it is desired to impart to the hanging curtain. Then the glider members, with the curtain attached to them, have to be inserted awkwardly by hand one after another into a widened slot at one end of the rail, and then to be pushed into the rail to remain therein in the manner described above. Often the person inserting the glider members has to stand on a ladder in order to reach the curtain rails which are usually fastened to the ceiling of a room.

OBJECT AND SUMMARY OF THE INVENTION

It is, therefore, an object of the present invention to solve the problem of providing a tool overcoming these difficulties and essentially simplifying the insertion of the carriers into the profiled rail by making it possible to seize the carriers securely and to orient them easily with respect to the rail.

In accordance with the invention this problem is solved by a tongs which comprises two tong arms having arm ends, one of which arm ends has an inward arm face turned toward an opposite inward arm face of the other arm end; these arm ends are adapted for engaging between them one of the glider members, each of the arm ends has a recess, open at the top and having a bottom contact face extending transversely to and above the inward arm face of that arm end, and a recess sidewall about the bottom contact face on three sides thereof, while the sidewall is open on the side thereof located above the inward face of that arm end, whereby, when the lower end of the upright bar portion of the glider member rests on the bottom contact faces of the recesses in the arm ends, extending through the open sides of the recess sidewalls, and the glider member ring part extends between the opposite inward faces of the arm ends underneath the recesses, then the glider member is held between the arm ends, upon closing of the tongs, and can then be inserted easily into the curtain rail in the position described hereinbefore.

Each of the arm ends preferably comprises an elongated centering means protruding from the face of the arm end turned toward the opposite face of the other arm end, centrally below the open side of the sidewall and below the flat bottom face of the recess, whereby when the glider member is in the position between the arm ends of the tongs closed thereon, the centering means are located with their free ends in the ring opening of the ring part.

The distance from an edge of the bottom contact face with the inward arm face to a sidewall section opposite the edge is preferably such that, upon closing of the tongs, the glider member is held firmly between the opposite sidewall sections. Each of the arm ends can comprise a detachable mount containing the recess, the sidewall and the centering means. The centering means can be pin- or plug-shaped.

These mounts can, for instance, be slipped onto the tips of the tong arms.

BRIEF DESCRIPTION OF THE DRAWING

Further details and advantageous features of the tongs according to the invention will appear from the following description thereof in connection with the accompanying drawing, in which.

DETAILED DESCRIPTION OF THE DRAWING

Figure 1:
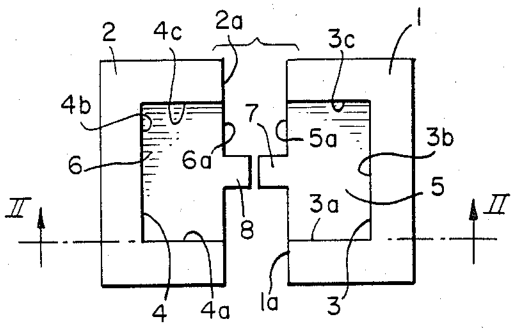
FIG. 1 is a top view onto the ends of the free arms of the tongs according to the invention.

In FIG. 1 there are shown the two arm ends 1 and 2 of the tongs, each of which is provided with a recess 3 or 4, respectively, having a flat contact face 5 or 6, respectively. Each flat contact face 5,6 is surrounded on three sides thereof by a recess sidewall 3*a*, 3*b* and 3*c* or 4*a*, 4*b* and 4*c*, respectively; each of the arm ends 1 and 2 has an inward arm face 1*a*, 2*a* turned toward the opposite inward arm face of the other arm.

The sidewalls about the recesses 3 and 4 are open at the edges 5*a* and 6*a* between the bottom contact faces 5 and 6 and the inward arm faces 1*a* and 2*a*, respectively. Preferably, the inner sides of the tong arms 1*a* and 2*a* bear projecting centering means 7 and 8 in the shape of plugs, which preferably have their upper end walls or faces terminate flush with the contact faces 5 and 6, respectively.

Figure 2:
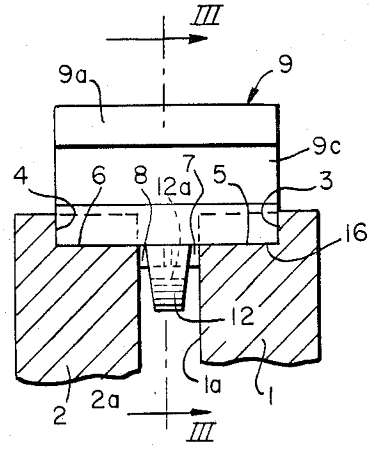
FIG. 2 is a sectional view taken along the line II—II in FIG. 1 through the arm ends of the tongs, with inserted curtain-carrying glider member.

As shown in FIG. 2, a curtain carrier 9, regardless of whether it has the illustrated or a different shape and cross-section is unequivocally held, in the closed tongs, by being inserted with its ends into the recesses 3 and 4 and on the contact faces 5 and 6, as well as by the centering means 7 and 8 penetrating from both sides into the opening 13 of the ring part 12 of the gliding member. It is thereby extremely simple to insert the curtain carrier 9 into the profiled rail 10, independently of whether this occurs at the end of the rail or at a cut-out opening specially provided in the rail for this purpose.

Figure 3:
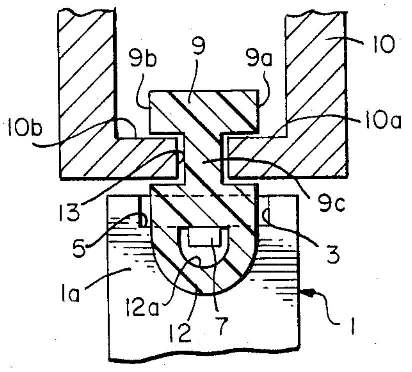
FIG. 3 is a cross-sectional view through the parts shown in FIG. 2 taken along the line III—III, wherein the carrier has already been inserted into a profiled curtain rail.

The sliding member or carrier 9 shown in FIGS. 2 and 3 comprises a track part having a T-shaped cross sectional area with a cross bar having two side arms 9*a* and 9*b* and the vertical or upright bar portion 9*c* therebetween. While the side arms 9*a* and 9*b* rest on the shoulders 10*a* and 10*b* of the rail 10 on both sides of the longitudinal slot 13 therein, the vertical bar portion 9*c* extends through that slot 13 downwardly and bears at its foot end a ring part 12 having an opening 12*a* which in the embodiment shown in the drawings, is of semicircular cross sectional area.

Owing to the configuration of the arm ends any above-described synthetic plastic resin curtain carrier 9 which is commercially available today, can be seized in the manner shown in FIGS. 2 and 3, given a corresponding dismensioning of the recesses 3 and 4 and the centering means 7 and 8, and can be inserted into a correspondingly profiled curtain rail 10. It does not matter whether the ring 12 is disposed transversely to the bar portion 9*c* as is the case in carrier 9 shown herein, or parallel to the bar portion. It is sufficient to introduce the curtain carrier 9 in such a manner between the arms 1 and 2 in, respectively, their recesses 5 and 6, that the ring 12 occupies the position illustrated in FIGS. 2 and 3, wherein the centering means 7 and 8 penetrate into the ring opening 12*a* and prevent an unintentional sliding of the curtain carrier 9 out of the tong arms 1 and 2.

Figure 4:
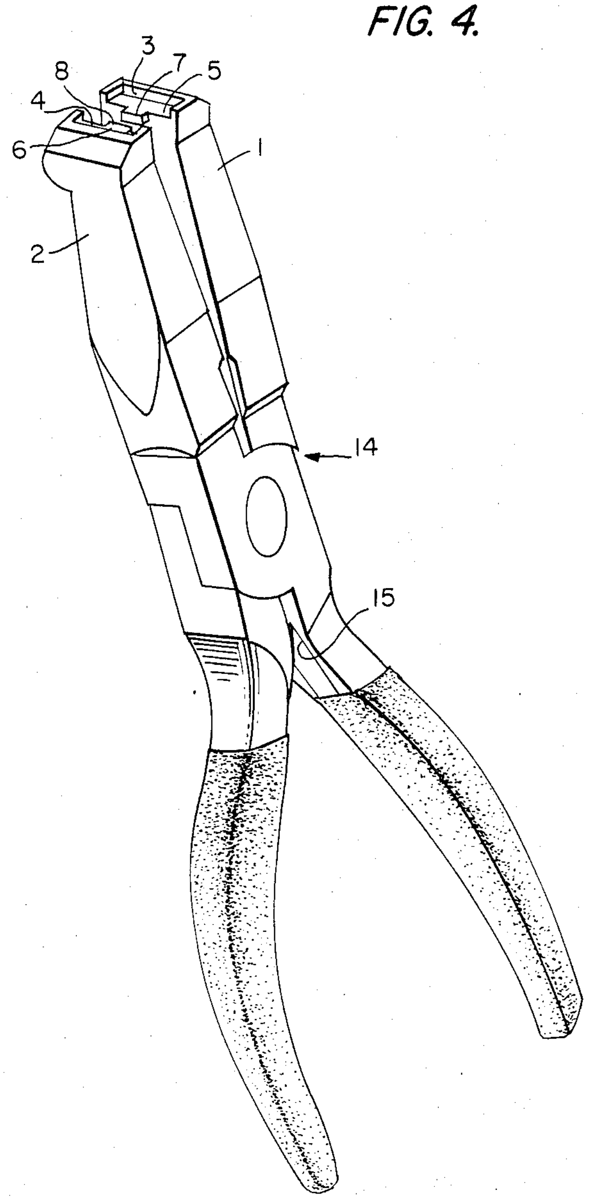
FIG. 4 is a perspective view of a preferred embodiment of the tongs according to the invention.

From the perspective illustration of a tongs 14 shown in FIG. 4, it is seen that its general shape resembles that of a pair of pliers, except that the tong arms 1 and 2 bear at their free ends the recesses 3 and 4 with the contact faces 5 and 6 and the centering plugs 7 and 8, respectively, which have been described further above.

Figure 5:
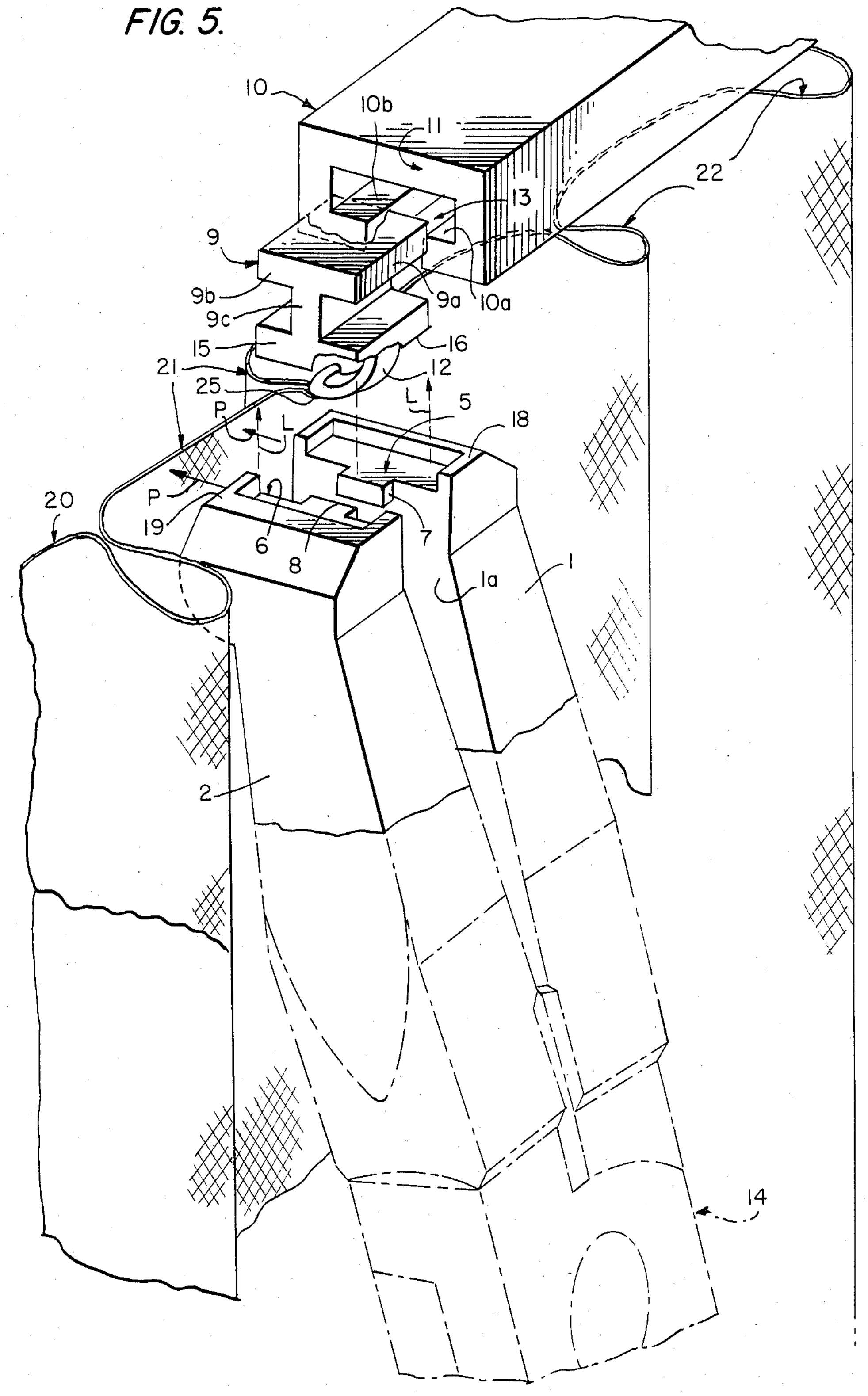
FIG. 5 illustrates a preferred mode of seizing a curtain-carrying member of the type described with the tongs of the embodiment shown in FIG. 4.

Finally, in FIG. 5 there is indicated how the tongs must approach a curtain carrier 9 for it to be seized by the tongs and to be inserted into the rail 10.

The folds 20, 21 and 22 are attached to a series of curtain carriers 9 of which the fold 21 is attached, by means of a string of threads 25, to the ring part 12 of the carrier 9, as can be seen due to the broken away corner of the foot part of the carrier.

In order to seize the curtain carrier 9, the tongs 14 is lifted (arrow L) with its jaws 1 and 2 slightly opened and pushing the curtain fold 21 slightly to the rear, transversely to the direction of the rail 10, (arrows P), until the contact faces 5 and 6 are flush with, or slightly below, the underside 16 of the curtain carrier 9; the latter is then fitted with its underside 16 into the recesses 3 and 4 and is brought to rest with its underside 16 on the contact faces 5 and 6, and with the ring part 12 of the carrier 9 extending into the gap between the inward arm faces 1*a* and 2*a*. The tongs 14 is then closed upon the carrier 9.

Owing to the fact that the seized carrier member 9 still protrudes with at least a part of its vertical bar portion 9*c* above the level of the upper end faces 18 and 19 of the tong arms 1 and 2, respectively, the side arms 9*a* and 9*b* of the carrier 9 can easily be raised high enough to be above the rail shoulders 10*a* and 10*b*, and it is then easy, by a lateral shift of the tongs, to introduce the vertical bar portion 9*c* into the slot 13 of the rail 10 from the open end 11 of the latter.

Even in the case of heavy curtains provided with the carriers 9 it is almost impossible, thanks to the tongs according to the invention, that an already seized carrier is dropped prior to its insertion into the rail as it can be seized firmly and securely by means of the tongs. Thereby, an enormous amount of time and trouble can be saved when hanging curtains.

It can be easily recognized that the shape of the recesses and of the centering means can be adapted accurately to a specific carrier, as required. Furthermore, it is possible without difficulty to provide recesses and centering means in separate mounts which can be attached to the ends of the tong arms and can be manufactured, for instance, from synthetic plastic resin material. The curtain rails are preferably made of a suitable metal such as aluminum.

Small curtain-carrying sliding hooks of synthetic resin material are commercially available as "gliders", e.g. by Von Bach, Keller & Co., Lyss, Berne, Switzerland.

I claim:

1. A tongs adapted for inserting a curtain-carrying glider member comprising a track part having a T-shaped profile and consisting essentially of an upright bar portion, a cross bar portion to the center of the underside of which the upper end of said upright bar portion is attached, and a ring part having a ring opening and depending from the lower end of said upright bar portion, into a curtain rail having a longitudinal extending opening in the bottom part thereof and shoulders of said rail bottom part to the right and to the left of said bottom opening, in such a manner that said cross bar portion of said glider member rests upon the shoulders of said rail bottom part, and the upright bar portion of said glider member track part extends downwardly through said rail bottom opening and protrudes with its lower end from the underside thereof, said ring part being located below said rail, which tongs comprise two tong arms having arm ends, one of said arm ends having an inward arm face turned toward an opposite inward arm face of the other arm end, said arm ends being adapted for engaging between them said glider member, each of said arm ends having a recess open at the top and having a bottom contact face extending transversely to and above the inward arm face of that arm end, and a recess sidewall about said bottom contact face on three sides thereof, said sidewall being open on the side thereof located above the inward face of that arm end, whereby, when said lower end of said upright bar portion of said glider member rests on said bottom contact faces of said recesses in said arm ends, extending through the open sides of said recess sidewalls, and said glider member ring part extends between the opposite inward faces of said arm ends underneath said recesses, said glider member is held between said arm ends, upon closing of said tongs; and each of said arm ends comprises elongated centering means protruding from the face of said arm end turned toward the opposite face of the other arm end, centrally below said open side of said sidewall and below the flat bottom face of said recess, whereby, when said glider member is in said position between said arm ends of the tongs closed thereon, said centering means are located with their free ends in said ring opening of said ring part.

2. The tongs of claim 1, wherein each of said arm ends comprises a detachable mount containing said recess, said sidewall and said centering means.

3. The tongs of claim 2, wherein said centering means are pin-shaped.

4. The tongs of claim 1, wherein said centering means are pin-shaped.

* * * * *